(12) United States Patent
Giese

(10) Patent No.: US 7,105,775 B2
(45) Date of Patent: Sep. 12, 2006

(54) WELDING GUN HAVING CONTACT TIP AND METHOD OF OPERATING SAME

(75) Inventor: William R. Giese, Beecher, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/215,811

(22) Filed: Aug. 9, 2002

(65) Prior Publication Data

US 2004/0026395 A1    Feb. 12, 2004

(51) Int. Cl.
    *B23K 9/173*    (2006.01)
(52) U.S. Cl. .............................. 219/137.42; 219/137.31
(58) Field of Classification Search ........... 219/137.42, 219/137.31
    See application file for complete search history.

(56) References Cited

U.S. PATENT DOCUMENTS

| 3,210,523 | A | * | 10/1965 | Cotter et al. ............ 219/137.71 |
| 3,576,423 | A |   | 4/1971  | Bernard et al. ............. 219/136 |
| 4,280,043 | A | * | 7/1981  | Feix et al. ............... 219/137.31 |
| 5,440,100 | A |   | 8/1995  | Stuart et al. ............ 219/137.31 |
| 5,491,321 | A |   | 2/1996  | Stuart et al. ........... 219/137.61 |
| 6,225,599 | B1 | * | 5/2001 | Altekruse ............... 219/137.31 |
| 6,525,297 | B1 | * | 2/2003 | Doherty ................. 219/137.31 |

FOREIGN PATENT DOCUMENTS

FR          2 291 819         11/1974

\* cited by examiner

*Primary Examiner*—Len Tran
(74) *Attorney, Agent, or Firm*—Fetcher Yoder

(57) ABSTRACT

A welding gun adapted to secure a contact tip within the welding gun without threading the contact tip and without the use of tools. The contact tip may be adapted to abut a surface of a first member disposed within the welding gun. The surface may be a surface of a gas diffuser. The surface may be adapted to abut the contact tip. The contact tip also may be adapted for abutment with a second member to urge the contact tip toward the first member. The second member may be a portion of a nozzle adapted to abut the contact tip to urge the contact tip toward the surface of the first member. A method of assembling a welding gun also is provided. The method may comprise disposing a contact tip between a first and a second member and capturing the contact tip between the first and second members.

19 Claims, 5 Drawing Sheets

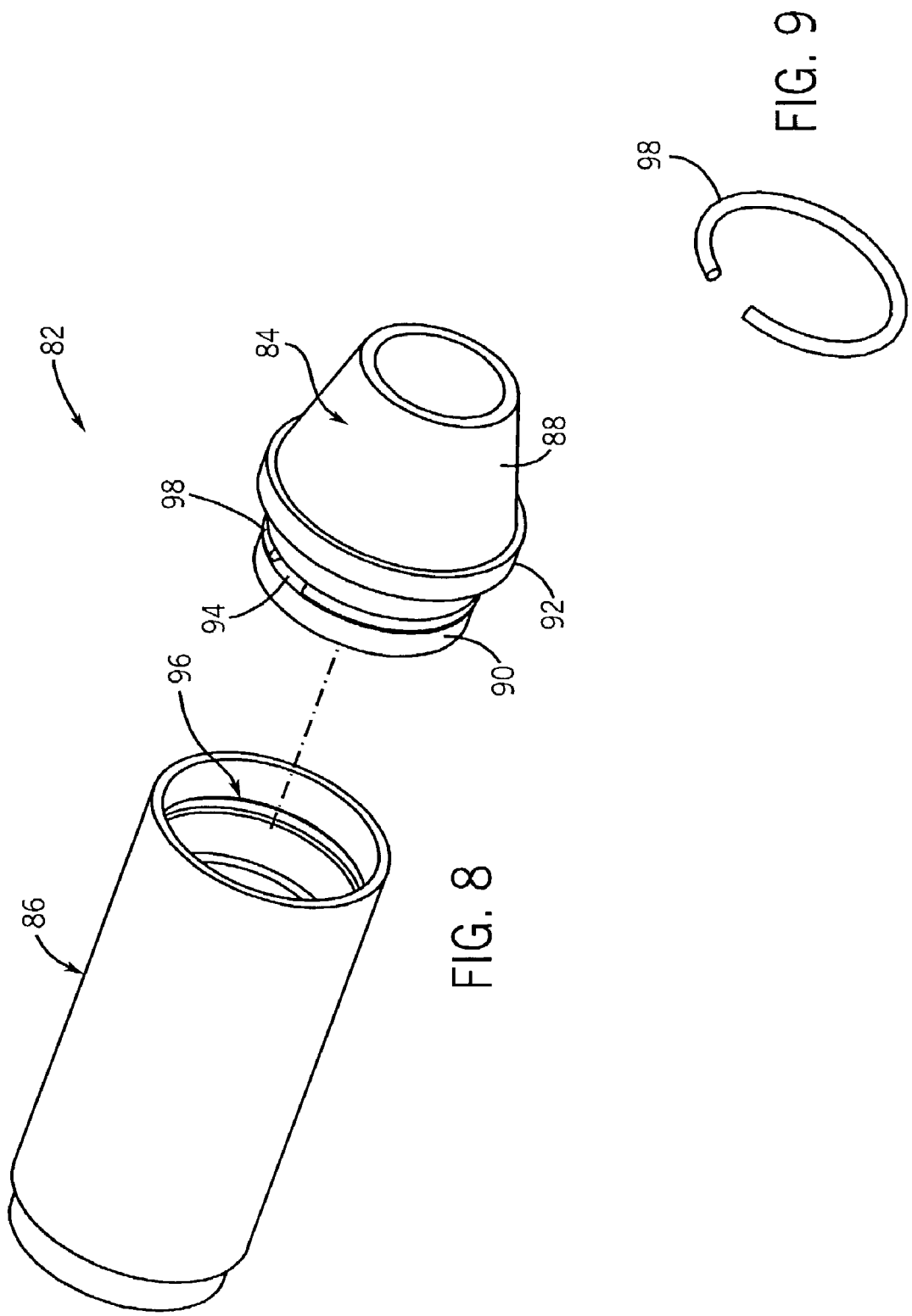

WELDING GUN HAVING CONTACT TIP AND METHOD OF OPERATING SAME

FIELD OF THE INVENTION

The present invention relates generally to welding systems, and particularly to a wire-feed welding gun having a tip to guide wire through a nozzle of a welding gun.

BACKGROUND OF THE INVENTION

Welding is a method of joining, or separating, metal objects. Arc welding is a common type of welding. An arc welding system typically is comprised of a power supply coupled by an electrical cable to a welding gun housing an electrode. A ground cable is used to connect the metal object to the power supply. When the electrode is placed against the metal object, the electrode in the welding handle completes an electrical circuit between the power supply and the metal object, allowing electrical current to flow through the electrode and metal object. The electrical current produces an arc between the electrode and the metal object. The heat of the electric arc melts the metal object in the region surrounding the electric arc. A filler material may be added to the molten metal. For example, a wire may be placed against the molten portion of the object, melting the wire and allowing the molten wire to merge with the molten object. Once the electrode is drawn away from the metal object, the circuit is broken and the molten mass begins to cool and solidify, forming a weld.

MIG (Metal Inert Gas) welding is one type of arc welding. MIG welding is also referred to as "wire-feed" or GMAW (Gas Metal Arc Welding). In MIG welding, a metal wire is used as the electrode. The wire is shielded by an inert gas and the metal wire acts as the filler for the weld. The inert gas is used to shield the molten metal from outside contaminants and gases that may react with the molten metal. Non-inert gases, such as $CO_2$, may also be used in MIG welding.

The wire and gas are coupled through a cable to a welding gun. A typical welding gun used in MIG welding and similar welding systems has a handle and a neck that extends from the handle. The wire and gas are directed through the neck towards a workpiece. The neck typically has a nozzle assembly that is secured to the neck to direct the flow of wire and gas towards the workpiece. The wire is directed through a contact tip housed within the nozzle assembly. The electrical current is coupled from the cable to the wire through the contact tip. In addition, the end of the nozzle assembly typically has a cone-shape to taper the flow of gas from the welding gun. A typical welding gun has a switch, or trigger, that is coupled to the wire feeder. When the trigger is operated, wire is fed through the tip and gas is directed through the nozzle towards a workpiece.

Contact tips require frequent replacement during operation of the welding gun. Many contact tips are threaded into the welding gun. However, threadless contact tip designs also have been used. For example, threadless contact tip designs having a cam surface have been used. The cam surface is adapted to bind the contact tip against a stationary protrusion when the contact tip is rotated.

Unfortunately, there are a number of problems associated with existing threadless contact tip designs. For example, the process of binding the contact tip against the protrusion produces a bending stress in the contact tip. In addition, variations in the distance between the contact tip and the exterior portion of the nozzle, known as the tip-nozzle recess, occur with existing threadless contact tip designs. A consistent tip-recess distance is critical in certain welding applications, especially robotic welding systems. In addition, molten spatter from the weld may deposit on the end of the nozzle, eventually requiring replacement of the nozzle. Consequently, nozzles having a nozzle body and a removable threaded end section have been developed. However, weld spatter may contaminate the threads or the threads may experience galling, requiring a tool, such as a wrench, to remove the threaded end section from the nozzle body.

There exists then a need for a welding gun that utilizes a threadless contact tip design. Additionally, there is a need for a welding gun that enables a contact tip to be installed and removed without the use of tools. Furthermore, there exists then a need for a welding gun that utilizes a removable nozzle end section that may be secured and removed without threads or the use of tools. Finally, there exists a need for a nozzle assembly having a threadless contact tip design that produces a consistent tip-recess distance.

SUMMARY OF THE INVENTION

The present technique provides a welding gun adapted to secure a contact tip within a nozzle assembly without threading the contact tip and without the use of tools. The contact tip may be captured by abutment between two members. The two members may be a gas diffuser and a portion of a nozzle.

In some embodiments of the present technique, a gas diffuser that is adapted to receive the contact tip in abutment is provided. The gas diffuser may have a tapered surface adapted for sealing engagement with a tapered surface of the contact tip. Furthermore, in some embodiments of the present technique, a nozzle adapted to abut a portion of the contact tip. The nozzle may comprise an insert disposed within a nozzle body. The nozzle may also be adapted for threaded engagement with the gas diffuser.

Another aspect of the present technique is a method of assembling a nozzle assembly of a welding gun. The method may comprise disposing a contact tip between two members of the nozzle assembly. The method may also comprise securing the nozzle to the gas diffuser to capture the contact tip between the gas diffuser and the nozzle.

BRIEF DESCRIPTION OF THE DRAWINGS

The foregoing and other advantages of the invention will become apparent upon reading the following detailed description and upon reference to the drawings in which:

FIG. 8 is an exploded view of the alternate embodiment of a nozzle assembly; and FIG. 9 is an embodiment of a retaining ring for securing the detachable cone to the nozzle, according to an exemplary embodiment of the present technique.

DETAILED DESCRIPTION OF SPECIFIC EMBODIMENTS

Figure 1:
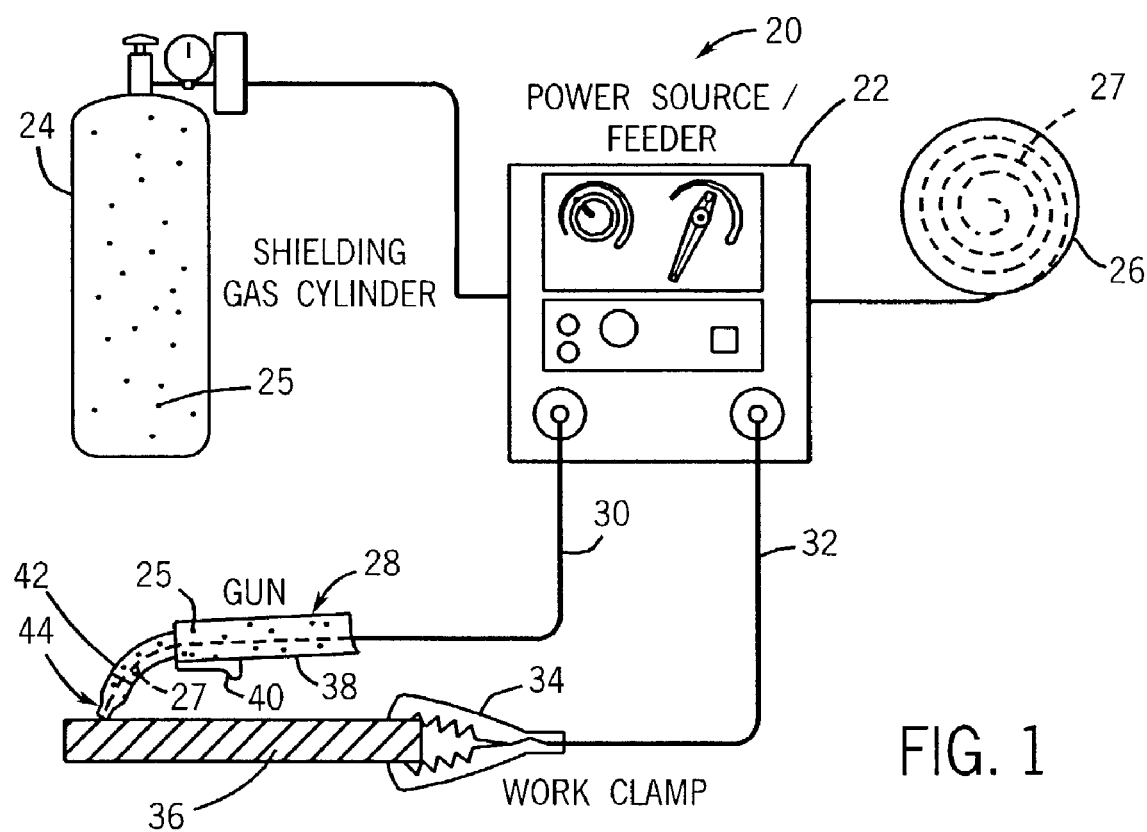
FIG. 1 is a diagram of a MIG welding system, according to an exemplary embodiment of the present technique.

Referring generally to FIG. 1, an exemplary metal inert gas ("MIG") welding system 20 is illustrated. However, the present technique may be used in other wire feed welding systems, such as submerged arc welding. The illustrated MIG welding system 20 comprises a power source/wire feeder 22, a gas cylinder 24 containing a gas 25, a spool 26 of electrode wire 27, a welding gun 28, a welding cable 30, a work clamp 32, and a ground cable 34. In the illustrated embodiment, the gas 25 and wire 27 are routed from the power source/wire feeder 22 to the welding cable 30. The welding cable 30, in turn, routes the gas 25 and the wire 27 to the welding gun 28. The power source/wire feeder 22 also may be comprised of a separate power source and a separate wire feeder.

The welding cable 30 also has conductors (not shown) for conveying large amounts of electric current from the power source/wire feeder 22 to the welding gun 28. The power source/wire feeder 22 is operable to control the feeding of wire 27 to the welding gun 28. In addition, the power source/wire feeder 22 also may be used to control the flow of gas 25 to the welding gun 28. To assemble the system, a ground cable 32 having a clamp 34 is connected to the power source/wire feeder 22. The clamp 34 is clamped onto a workpiece 36 to electrically couple the workpiece 36 to the power source/wire feeder 22. The work clamp 32 and ground cable 34 electrically couple the power source/feeder 22 to the workpiece 36. Additionally, the wire 27 within the MIG welding cable 30 may be electrically coupled to the power source/wire feeder 22.

The welding gun 28 is used to direct the wire 27 towards the workpiece 36. When the wire is touched to the workpiece 36, an electrical circuit between the workpiece 36 and power source/wire feeder 22 is completed. Electric current flows from the power source 22 through the welding cable 30, the electrode wire 27, the workpiece 36, the workclamp 34, and the ground cable 32 back to the power source 22. An arc is produced between the electrode wire 27 and the workpiece 36. The electric arc melts the workpiece 36 in a region surrounding the arc, forming a weld puddle. The heat of the arc melts the wire 27 along with the workpiece 36, enabling the electrode wire 27 to act as a filler material for the weld puddle. The inert gas 25 forms a shield that prevents harmful chemical reactions from occurring at the weld puddle. When the arc is removed, the weld puddle solidifies, forming the weld.

Figure 2:
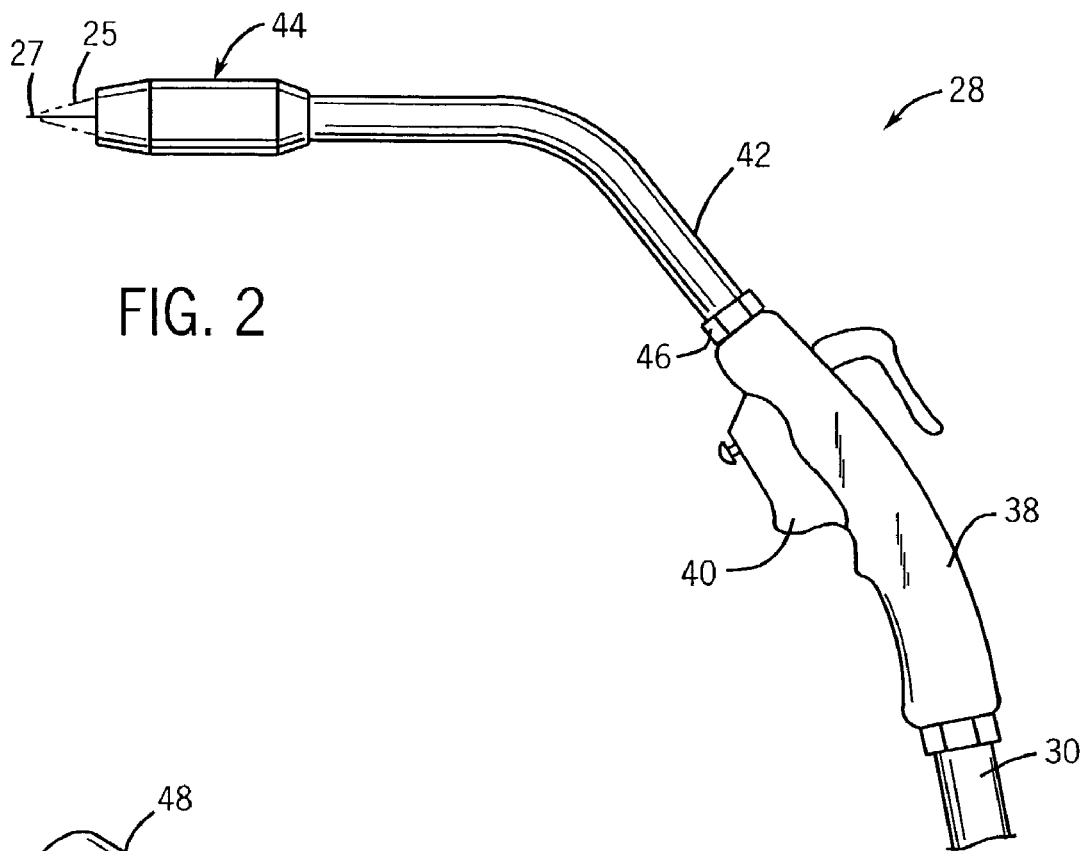
FIG. 2 is a front elevational view of a MIG welding gun, according to an exemplary embodiment of the present technique.

Referring generally to FIGS. 1 and 2, the welding gun 28 comprises a handle 38, a trigger 40, a neck 42, and a nozzle assembly 44. The neck 42 is secured to the handle 38 by a locking nut 46. The MIG welding cable 30 also has an electrical cable (not shown) that is electrically coupleable to the trigger 40. The trigger 40 enables a user to control the supply of electrode wire 27 and power from the power source/feeder 22. A number of events occur when the trigger 40 is operated. One event is that the power source/wire feeder 22 draws in wire 27 from the wire spool 26 and feeds it though the MIG welding cable 30 to the welding gun 28. Also, electric power from the power source/feeder 22 is supplied to the wire 27. The welding gun may be adapted to enable the flow of gas 25 from the gas cylinder 24 to be controlled by the trigger 40. The wire 27 and gas 25 are then fed through the neck assembly 42 towards the workpiece 36. The nozzle assembly 44 directs the wire 27 and gas 25 towards the target 36. When the trigger 40 is released, the wire 27 and electric current are no longer fed to the welding gun 28.

Figure 3:
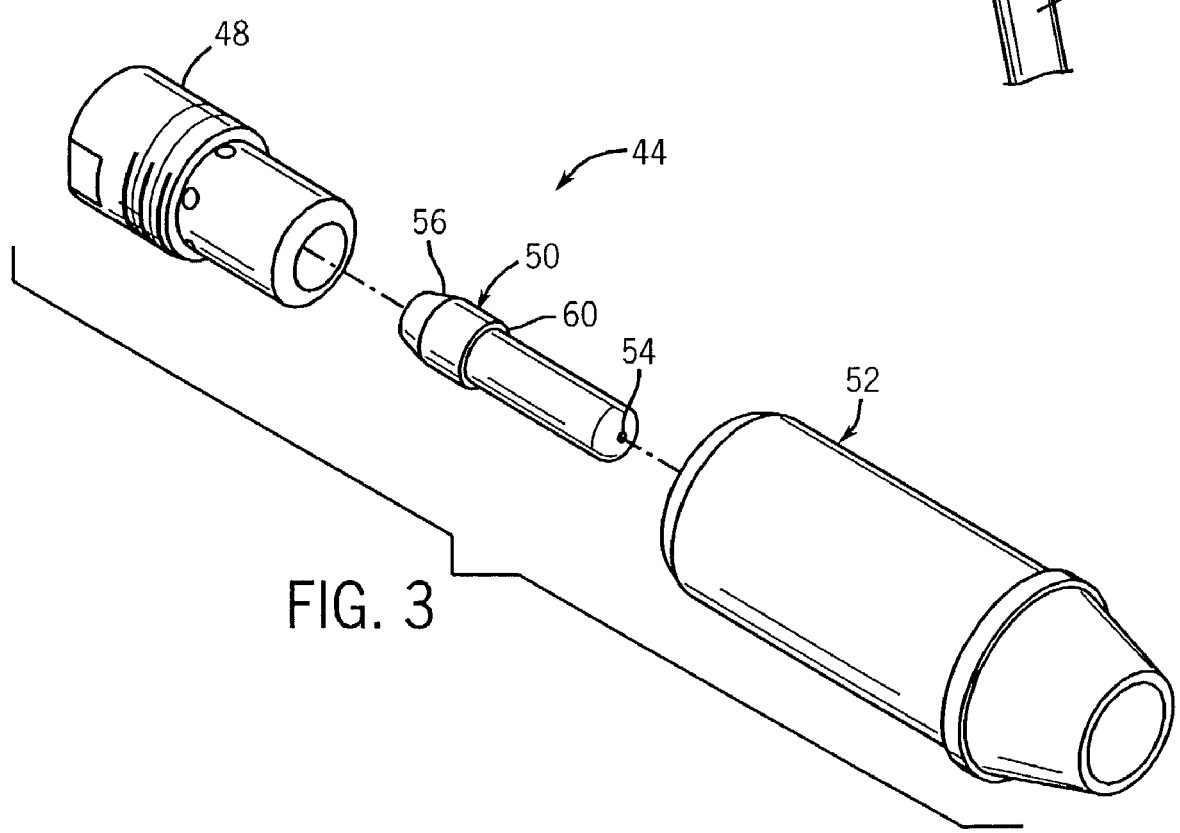
FIG. 3 is an exploded view of the nozzle assembly of the MIG welding gun of FIG. 2.

Referring generally to FIG. 3, the nozzle assembly 44 comprises a gas diffuser 48, a tip 50, and a nozzle 52. Gas 25 flows from the welding cable 30 and the welding gun 28 to the gas diffuser 48. The gas diffuser 48 is used to establish desired flow characteristics of the gas 25. The nozzle 52 is used to direct the gas 25 from the gas diffuser 48 towards the workpiece 36. The tip 50 is used to direct the wire 27 from the welding gun 28 and to conduct electric current from the welding cable 30 to the electrode wire 27. The large amounts of electric current drawn from a typical power source/wire feeder 22 during welding could damage the electrode wire 27 if the electric current was conducted through the entire length of the electrode wire. Therefore, the welding cable 30, rather than the electrode wire, is used to conduct most, if not all, of the electric current from the power source/wire feeder 22 to the welding gun 28. The contact tip 50 is used to transfer the electric current flowing through the welding cable 30 to the electrode wire 27. The contact tip 50 is electrically coupled to the welding cable 30 by the neck 42 and the gas diffuser 48.

In the illustrated embodiment, the contact tip 50 is secured within the welding gun 28 by abutment with the gas diffuser 48 and nozzle 52, rather than by threading the tip 50 into the gas diffuser 48. The contact tip 50 has a channel 54 that extends through the length of the contact tip 50 that is used to direct the electrode wire 27 through the contact tip 50. In addition, the channel 54 is used to bring the electrode wire 27 into contact with the contact tip 50 so that electric current may be conducted from the contact tip 50 to the electrode wire 27. In the illustrated embodiment, the channel 54 defines an axis extending linearly through the contact tip 50, the gas diffuser, and the nozzle 52. In addition, in this embodiment, the contact tip 50 is symmetrical about the axis.

Figure 4:
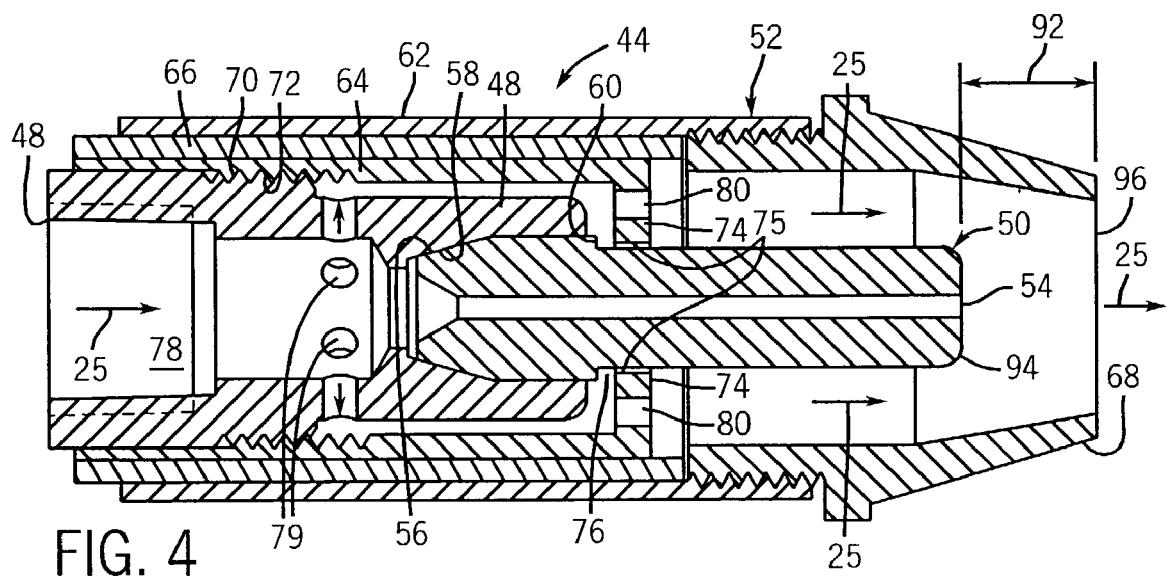
FIGS. 4 and 5 are cross-sectional views of the nozzle assembly, illustrating the assembly of the nozzle assembly, according to an exemplary embodiment of the present technique.

As best illustrated in FIG. 4, the contact tip 50 has an end surface 56 that is adapted to abut a seating surface 58 of the gas diffuser 48 and a shoulder 60 that extends around the contact tip 50 for engagement by the nozzle 52. In the illustrated embodiment, the end surface 56 is uniform around the contact tip 50. Preferably, the end surface 56 of the contact tip 50 and the seating surface 58 of the gas diffuser 48 are adapted for sealing engagement to prevent gas from escaping between the gas diffuser 48 and the contact tip 50. In the illustrated embodiment, the end surface 56 and the seating surface 58 are tapered to have a generally conical shape. However, the end surface 56 and the seating surface 58 may be curved or otherwise configured for mutual abutment and/or for sealing engagement. In the illustrated embodiment, the shoulder 60 protrudes from the contact tip 50 and is adapted to be abutted. In this embodiment, the shoulder 60 is uniform around the contact tip 50.

In the illustrated embodiment, the nozzle 52 and the contact tip 50 are secured to the welding gun when the nozzle 52 is secured to the gas diffuser 48. The nozzle 52 has a nozzle body 62, a nozzle insert 64, and a layer of insulation material 66 disposed between the nozzle insert 64 and the nozzle body 62. In the illustrated embodiment, the nozzle body 62 has a conical portion 68 for directing the flow of gas 25 towards the workpiece 36. The nozzle insert 64 has a threaded portion 70 that is adapted for threaded engagement with a threaded portion 72 of the gas diffuser 48. In the illustrated embodiment, the nozzle insert 64 has an annular portion 74 that is adapted for engagement with the shoulder 60 of the contact tip 50. The annular portion 74 has an opening 75 therethrough for enabling the contact tip 50 to extend through the nozzle insert 64. The annular portion 74 may be a separate removable securing member, such as a retaining ring or snap ring.

Preferably, the shoulder 60 extends around the entire circumference of the contact tip 50 and is transverse to the axis of the contact tip 50 so as to be in facing relationship with the annular portion of the nozzle insert 64. The contact tip may be adapted with other types of protrusion, other than the shoulder 60 illustrated in the figures. For example, the contact tip may be adapted with a plurality of separate protrusions spaced at various locations around the circumference of the contact tip. In addition, a securing member, such as a retaining ring or snap ring, may be secured to the tip to act as a protrusion.

The contact tip 50 is disposed between the gas diffuser 48 and the nozzle 52 prior to securing the nozzle 52 to the gas diffuser 48. Because the illustrated embodiment is uniform about the axis of the contact tip 50, the contact tip 50 may be disposed between the gas diffuser 48 and nozzle 52 in any rotational orientation. As illustrated, there is a gap 76 between the annular portion 74 and the shoulder 60 of the contact tip 50. However, the contact tip 50 may be disposed through the nozzle insert 64 prior to disposing the contact tip 50 against the gas diffuser 48. Consequently, the gap 76 may be between the gas diffuser 48 and the contact tip 50, rather than between the contact tip 50 and the nozzle insert 64.

Figure 5:
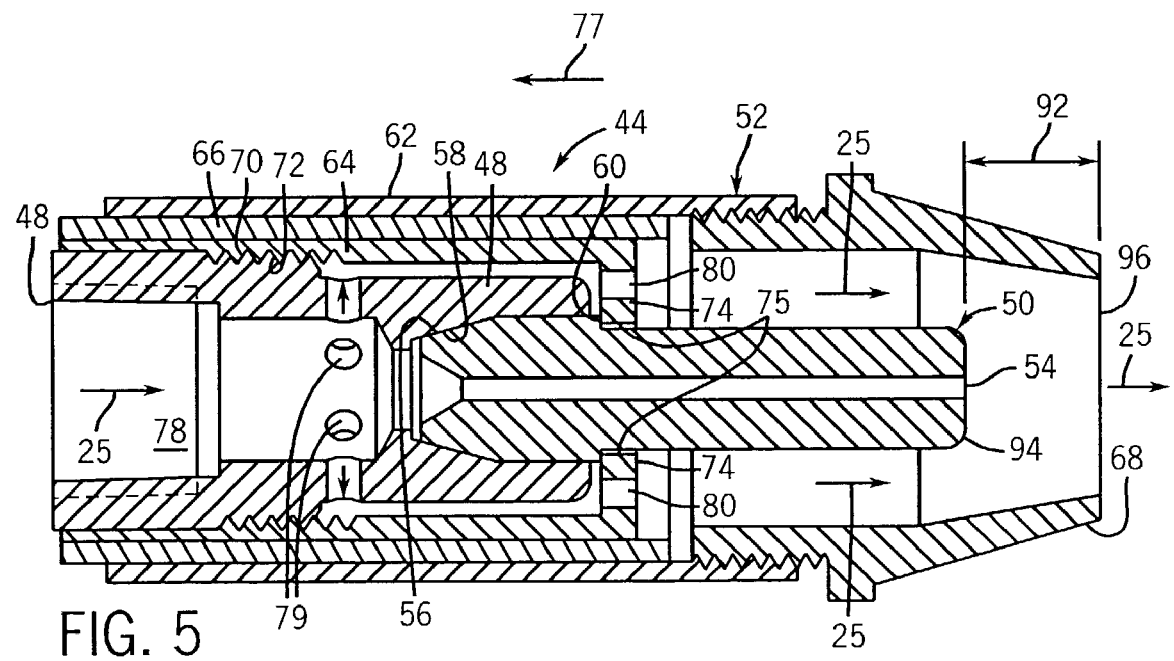

As best illustrated in FIG. 5, the nozzle 52 is drawn towards the gas diffuser 48 as the nozzle 52 is threaded onto the gas diffuser 48, as represented by the arrow 77. The annular portion 74 of the nozzle insert 64 abuts the shoulder 60 of the contact tip 50 and urges, or holds, the contact tip 50 axially against the gas diffuser 48, bringing the end surface 56 of the contact tip 50 into abutment with the seating surface 58 of the gas diffuser 48 and thereby capturing the contact tip 50 between the gas diffuser 48 and the nozzle 52. Preferably the annular portion 74 of the nozzle insert 64 extends around the inner portion of the nozzle 52.

Figure 6:
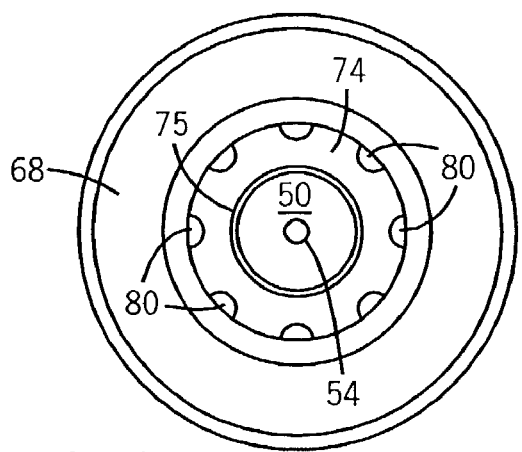
FIG. 6 is an end view of the nozzle assembly of FIG. 4.

Referring generally to FIGS. 4–6, gas 25 enters the gas diffuser 48 from the neck 42 via an entrance chamber 78. In the illustrated embodiment, the gas diffuser has a plurality of exit holes 79 for the gas 25 to exit the gas diffuser 48. In addition, the annular portion 74 of the nozzle 52 has a plurality of gas delivery holes 80. The gas delivery holes may be round, or slots. The gas delivery holes 80 enable gas 25 to pass through the annular portion 74 and enter the conical portion 68 of the nozzle 52. Contrary to previous nozzle embodiments, the gas delivery holes 80 of the illustrated embodiment extend in parallel to the contact tip 50, thus improving the flow characteristics of the gas 25 flowing from the nozzle 52.

Figure 7:
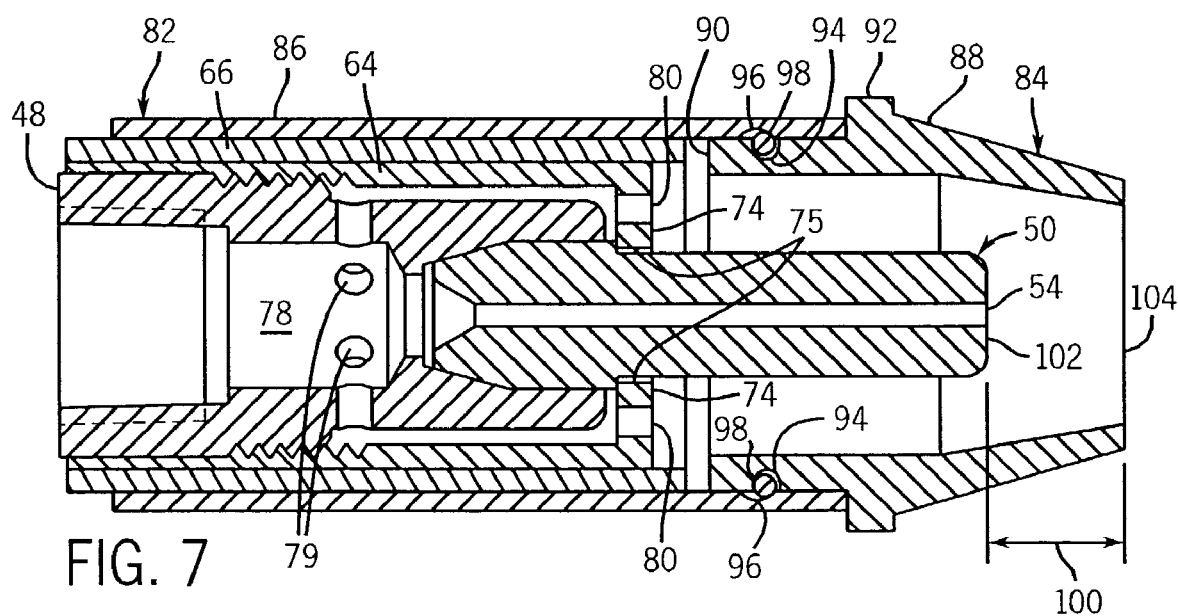
FIG. 7 is a cross-sectional view of an alternate embodiment of a nozzle assembly, according to an exemplary embodiment of the present technique.

Referring generally to FIGS. 7–9, an alternative embodiment of a nozzle 82 is illustrated. In this embodiment, a detachable cone 84 is used. The detachable cone 84 is adapted to be secured to and removed from a nozzle body 86 without the use of a tool. In the illustrated embodiment, the detachable cone 84 comprises a conical portion 88, a cylindrical portion 90, and an annular ring portion 92. The cylindrical portion 90 of the detachable cone 84 is disposed within the interior of the nozzle body 86. The annular ring 92 limits the travel of the detachable cone 84 into the nozzle body 86. In the illustrated embodiment, the cylindrical portion 90 has an external groove 94 and the nozzle body 86 has a corresponding internal groove 96. However, the cylindrical portion 90 and the nozzle body 86 may be adapted conversely, i.e., the cylindrical portion 90 may have an internal groove 96 and the nozzle body 86 may have the external groove 94. In addition, in this embodiment, a spring retaining ring 98 is disposed within the external groove 94 of the detachable cone 84 to secure the cone 84 to the nozzle body 86. However, other devices, such as a snap ring, may be used to secure the detachable cone 84 to the nozzle body 86.

In the illustrated embodiment, the cylindrical portion 90 of the detachable cone 84 is pushed into the nozzle body 86 to secure the cone 84 to the nozzle body 86. During installation of the cone 84, the ring 98 is compressed as the cylindrical portion 90 of the cone 84 is inserted into the nozzle body 86. A user may compress the retaining ring 98 or the ring 98 may be compressed by the nozzle body 86. When the retaining ring 98 reaches the internal groove 96 in the nozzle body 86, the retaining ring 98 expands outward into the internal groove 96. In the illustrated embodiment, retaining ring 98 occupies a portion of the internal groove 94 of the cone 84 and the internal groove 96 of the nozzle body 86, thereby obstructing displacement of the cone 84 and nozzle body 86 and securing the cone 84 to the nozzle body 86.

In the illustrated embodiment, the retaining ring 98 is strong enough to secure the cone 84 to the nozzle body 86, but may be overcome by a user. To remove the detachable cone 84 from the nozzle body 86, a user grabs the cone 84 and pulls the cone 84 away from the nozzle body 88. The annular ring portion 92 assists a user in gripping the detachable cone 84. A new detachable cone 84 and/or retaining ring 98 may then be secured to the nozzle body 86. Thus, the detachable cone 84 may be secured to the nozzle 52 and removed without the use of tools.

The above embodiments provide a contact tip and a detachable cone that are threadless. In addition, because the contact tip is secured by threading the relatively large diameter nozzle to the gas diffuser, rather than the contact tip, no tools are needed to secure the contact tip to or remove the contact tip from the nozzle assembly. In addition, the cone may be secured to and removed from the nozzle without the use of tools. Furthermore, as best illustrated in FIGS. 5 and 7, the embodiments provided above enable the tip-nozzle recess 100 between the end 102 of the tip 50 and the exit opening 104 of the conical portion 88 of the nozzle 52 to be consistent as contact tips and conical portions of the nozzle are replaced.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A contact tip for a welding implement, comprising:
   an opening through the contact tip defining an axis through the contact tip;
   a first surface disposed around the opening at one end of the contact tip, and configured to abut a corresponding seating surface located on a gas diffuser of the welding implement; and
   a shoulder extending around at least a portion of the contact tip to enable a movable second member to urge the first surface against the seating surface of the gas diffuser.

2. The contact tip as recited in claim 1, wherein the shoulder extends transversely to the opening through the contact tip.

3. The contact tip as recited in claim 1, wherein the first surface is adapted for sealing engagement with a corresponding surface of the first member.

4. The contact tip as recited in claim 1, wherein the first surface comprises a conical section.

5. A contact tip for a welding implement, comprising a shoulder adapted for abutment with a removable nozzle to enable the removable nozzle to urge the contact tip in a first direction, wherein the contact tip is secured by its abutment with the nozzle and a gas diffuser, the nozzle and diffuser and being coaxial with one another.

6. The contact tip as recited in claim 5, wherein the contact tip comprises a first surface surrounding an opening through the contact tip, the first surface being adapted for sealing abutment with a corresponding surface of the gas diffuser.

7. The contact tip as recited in claim 5, wherein the shoulder extends substantially around the contact tip.

8. The contact tip as recited in claim 5, wherein the shoulder extends transversely to an opening through the contact tip.

9. A contact tip for a welding implement, comprising:
an opening through the contact tip adapted to receive an electrode wire therethrough; and
a shoulder extending around at least a portion of the contact tip transverse to the opening to enable the contact tip to be urged linearly against a seating surface of a first member having closed passageways for routing gas and extending radially through the diffuser by a second member abutted against the shoulder.

10. The contact tip as recited in claim 9, comprising a first surface adapted to abut a corresponding surface of the first member.

11. The contact tip as recited in claim 10, wherein the first surface is adapted for sealing engagement with the corresponding surface of the first member.

12. The contact tip as recited in claim 10, wherein the first surface comprises a conical section.

13. A method of securing a contact tip to a welding implement, comprising the acts of:

disposing a first end of the contact tip against a corresponding surface of a gas diffuser having a plurality of passageways extending radially therethrough;

disposing a second end of the contact tip through a nozzle; and reducing the axial displacement of the nozzle relative to the gas diffuser to abut the nozzle against the contact tip to enable the nozzle to urge the first end of the contact tip linearly into abutment against the corresponding surface of the gas diffuser.

14. The method as recited in claim 13, wherein disposing a second end comprises inserting a portion of the contact tip through an annular portion of the nozzle.

15. The method as recited in claim 13, wherein reducing the displacement of the nozzle comprises threading the nozzle to the welding implement.

16. A welding implement, comprising:
a contact tip having a channel for routing welding electrode extending therethrough, a first surface disposed about the channel and located at one end of the contact tip, and a shoulder extending around at least a portion of the contact tip;
a gas diffuser having a seating surface for sealing abutment with the first surface, and a passageway extending radially through the diffuser for routing gas; and
a nozzle having a flange portion extending from an inner surface of the nozzle and configured to abut the shoulder to drive the first surface toward the seating surface when the nozzle is assembled with respect to the welding implement.

17. The welding implement as recited in claim 16, wherein the first and seating surfaces are conical and corresponding with respect to one another.

18. The welding implement as recited in claim 16, wherein the nozzle is to the gas diffuser via corresponding threads.

19. The welding implement as recite in claim 16, wherein the contact tip is located intermediate of the nozzle and the gas diffuser.

* * * * *